(12) United States Patent
Cho

(10) Patent No.: US 10,929,236 B2
(45) Date of Patent: Feb. 23, 2021

(54) MEMORY SYSTEM, METHOD OF OPERATING THE SAME, AND DATA PROCESSING SYSTEM INCLUDING THE SAME

(71) Applicant: SK hynix Inc., Gyeonggi-do (KR)

(72) Inventor: Kyoung-Ku Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 164 days.

(21) Appl. No.: 16/050,070

(22) Filed: Jul. 31, 2018

(65) Prior Publication Data
US 2019/0188083 A1 Jun. 20, 2019

(30) Foreign Application Priority Data
Dec. 19, 2017 (KR) .................... 10-2017-0174907

(51) Int. Cl.
*G06F 11/00* (2006.01)
*G06F 11/14* (2006.01)

(52) U.S. Cl.
CPC .... *G06F 11/1441* (2013.01); *G06F 2201/805* (2013.01); *G06F 2201/82* (2013.01)

(58) Field of Classification Search
CPC ............. G06F 11/1666; G06F 11/2084; G06F 11/1088; G06F 11/1064; G06F 11/1068; G06F 11/1077; G06F 11/0727; G06F 11/073; G06F 11/1008; G06F 11/2053
USPC ........................................................ 714/6.12
See application file for complete search history.

(56) References Cited

U.S. PATENT DOCUMENTS

| | | | | |
|---|---|---|---|---|
| 2013/0166855 A1* | 6/2013 | Batwara | ................ | G06F 3/0608 711/154 |
| 2014/0331034 A1* | 11/2014 | Ponce | .................. | G06F 9/4401 713/1 |
| 2015/0121126 A1* | 4/2015 | Bradshaw | ........... | G06F 11/0727 714/6.3 |
| 2015/0378808 A1* | 12/2015 | Kumar | ............... | G06F 11/0769 714/799 |
| 2016/0011818 A1* | 1/2016 | Hashimoto | ........ | G11C 16/3495 711/103 |

FOREIGN PATENT DOCUMENTS

KR 1020090042039 4/2009
KR 1020120057950 6/2012

* cited by examiner

*Primary Examiner* — Sarai E Butler
(74) *Attorney, Agent, or Firm* — IP & T Group LLP

(57) ABSTRACT

A data processing system may include a host and a memory system, the memory system may include a volatile recovery selection register and a nonvolatile memory device, wherein the memory system checks, after being reset, a value of the recovery selection register and determines whether to perform a recovery operation on the nonvolatile memory device, and when a reset is requested from the host, the memory system sets the value of the recovery selection register and resets the nonvolatile memory device, and the host may read set first data from the memory system through a first booting operation that starts during a power-on operation, may request a reset to the memory system, and may read set second data form the memory system through a second booting operation that starts after the reset of the memory system.

19 Claims, 12 Drawing Sheets

MEMORY SYSTEM, METHOD OF OPERATING THE SAME, AND DATA PROCESSING SYSTEM INCLUDING THE SAME

CROSS-REFERENCE TO RELATED APPLICATION

This application claims priority under 35 U.S.C. § 119 to Korean Patent Application No. 10-2017-0174907 filed on Dec. 19, 2017, which is incorporated herein by reference in its entirety.

BACKGROUND

1. Field

Various embodiments relate to a data processing system including a host and a memory system. Particularly, the embodiments relate to a memory system configured to support a recovery operation of an associated nonvolatile memory device, and a data processing system including the memory system.

2. Discussion of the Related Art

The computer environment paradigm has shifted to ubiquitous computing systems that can be used anytime and anywhere. As a result, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts as compared with a hard disk device. Examples of memory systems having such advantages include universal serial bus (USB) memory devices, memory cards having various interfaces, and solid state drives (SSD).

SUMMARY

Various embodiments are directed to a memory system capable of optimizing a point in time at which a recovery operation is performed on a nonvolatile memory device included therein, a method of operating the memory system, and a data processing system including the memory system.

In an embodiment, a data processing system may include a host and a memory system, the memory system may include a volatile recovery selection register and a nonvolatile memory device, wherein the memory system checks, after being reset, a value of the recovery selection register and determines whether to perform a recovery operation on the nonvolatile memory device, and when a reset is requested from the host, the memory system sets the value of the recovery selection register and resets the nonvolatile memory device, and the host may read set first data from the memory system through a first booting operation that starts during a power-on operation, may request a reset to the memory system, and may read set second data form the memory system through a second booting operation that starts after the reset of the memory system.

The memory system may further include a controller configured to control an operation of the nonvolatile memory device under control of the host, the controller may include a host controller configured to process an operation between the controller and the host, and a memory controller coupled with the host controller and configured to process an operation between the controller and the nonvolatile memory device, and the recovery selection register may be included in the host controller.

When a reset is requested from the host, the host controller may check whether to perform the recovery operation on the nonvolatile memory device through the memory controller, as a result of the checking, when the recovery operation is to be performed on the is nonvolatile memory device, the host controller may set the value of the recovery selection register to a certain value, and when the recovery operation is not to be performed on the nonvolatile memory device, the host controller may set the value of the recovery selection register to an initial value, and after the value of the recovery selection register may be set, the host controller may reset both the memory controller and the nonvolatile memory device.

After the memory controller and the nonvolatile memory device are reset, the host controller may check the value of the recovery selection register, even in the absence of an independent trigger from the host, and, as a result of the checking, when the value of the recovery selection register is the certain value, the host controller may perform the recovery operation on the nonvolatile memory device through the memory controller.

When a reset is requested from the host, the host controller may check whether to perform a recovery operation on the nonvolatile memory device through the memory controller, as a result of the checking, when the recovery operation is to be performed on the nonvolatile memory device, the host controller may set the value of the recovery selection register to a certain value, and when the recovery operation is not to be performed on the nonvolatile memory device, the host controller may set the value of the recovery selection register to an initial value, and after the value of the recovery selection register is set, the host controller may reset the nonvolatile memory device through the memory controller.

The host controller may start to perform the recovery operation on the nonvolatile memory device through the memory controller in response to setting the recovery selection register to the certain value, even in the absence of an independent trigger from the host, and the memory controller may perform an operation of resetting the nonvolatile memory device in response to a request of the host controller, and then may continue to perform the recovery operation on the nonvolatile memory device, even in the absence of an independent request from the host controller.

The nonvolatile memory device may include a boot loader region and a normal region, and the host may read the set first data from the boot loader region through the first booting operation, and may read the set second data from the normal region through the second booting operation.

In an embodiment, a memory system may include: a controller may include a volatile recovery selection register; and a nonvolatile memory device, the controller may check, after being reset, a value of the recovery selection register and may determine whether to perform a recovery operation on the nonvolatile memory device, and when a reset is requested from a host, the controller may set the value of the recovery selection register and resets the nonvolatile memory device.

The controller may further include: a host controller configured to process an operation between the controller and the host; and a memory controller coupled with the host controller, and configured to process an operation between the controller and the nonvolatile memory device, and the recovery selection register may be included in the host controller.

When a reset is requested from the host, the host controller may check whether to perform a recovery operation on the nonvolatile memory device through the memory controller, as a result of the checking, when the recovery operation is to be performed on the nonvolatile memory device, the host controller may set the value of the recovery selection register to a certain value, and when the recovery operation is not to be performed on the nonvolatile memory device, the host controller may set the value of the recovery selection register to an initial value, and after the value of the recovery selection register is set, the host controller may reset both the memory controller and the nonvolatile memory device.

After the memory controller and the nonvolatile memory device are reset, the host controller may check the value of the recovery selection register, even in the absence of an independent trigger from the host, and as a result of the checking, when the value of the recovery selection register is the certain value, the host controller may perform the recovery operation on the nonvolatile memory device through the memory controller.

When a reset is requested from the host, the host controller may check whether to perform the recovery operation on the nonvolatile memory device through the memory controller, as a result of the checking, when the recovery operation is to be performed on the nonvolatile memory device, the host controller may set the value of the recovery selection register to a certain value, and when the recovery operation is not to be performed on the nonvolatile memory device, the host controller may set the value of the recovery selection register to an initial value, and after the value of the recovery selection register is set, the host controller may reset the nonvolatile memory device through the memory controller.

The host controller may start to perform the recovery operation on the nonvolatile memory device through the memory controller in response to setting the recovery selection register to the certain value, even in the absence of an independent trigger from the host, and the memory controller may perform an operation of resetting the nonvolatile memory device in response to a request of the host controller, and then may continue to perform the recovery operation on the nonvolatile memory device, even in the absence of an independent request from the host controller.

In an embodiment, a method of operating a memory system comprising a volatile recovery selection register and a nonvolatile memory device, the method may include: performing a recovering operation of checking, after the memory system is reset, a value of the recovery selection register, and determining whether to perform a recovery operation on the nonvolatile memory device; and performing a reset operation of setting, when a reset is requested from a host, the value of the recovery selection register, and resetting the nonvolatile memory device.

The memory system may further include a host controller configured to process an operation between the memory system and the host, and a memory controller coupled with the host controller and configured to process an operation between the memory system and the nonvolatile memory device, and the recovery selection register may be included in the host controller.

Performing the reset operation may include: checking, in a first checking operation, when a reset is requested from the host, whether to perform the recovery operation on the nonvolatile memory device through the memory controller; setting, in a first setting operation, the value of the recovery selection register to a certain value through the host controller when the recovery operation is to be performed on the nonvolatile memory device as a result of the first checking operation; setting, in a second setting operation, the value of the recovery selection register to an initial value through the host controller when the recovery operation is not to be performed on the nonvolatile memory device as the result of the first checking operation; and resetting the memory controller and the nonvolatile memory device after the first or second setting operation.

Performing the recovering operation may include: checking, in a second checking operation, by the host controller, the value of the is recovery selection register, even in the absence of an independent trigger from the host, after the resetting; and performing the recovery operation on the nonvolatile memory device through the memory controller when the value of the recovery selection register is the certain value as a result of the second checking operation.

Performing the reset operation may include: checking, in a third checking operation, when a reset is requested from the host, whether to perform the recovery operation on the nonvolatile memory device through the memory controller; setting, in a third setting operation, the value of the recovery selection register to a certain value through the host controller when the recovery operation is to be performed on the nonvolatile memory device as a result of the third checking operation; setting, in a fourth setting operation, the value of the recovery selection register to an initial value through the host controller when the recovery operation is not to be performed on the nonvolatile memory device as the result of the third checking operation; and resetting the nonvolatile memory device through the memory controller after the third or fourth setting operation.

The recovering operation may include: starting to perform the recovery operation on the nonvolatile memory device through the memory controller in response to setting the value of the recovery selection register to the certain value through the third setting operation, even in the absence of an independent trigger from the host; and continuing to perform, after the resetting is performed, the recovery operation on the nonvolatile memory device that started in the starting.

In an embodiment, a memory system operatively engaged with a host, may include: a nonvolatile memory device; and a controller electrically coupled to the nonvolatile memory device, the controller may be configured to determine whether to perform a recovery operation on the nonvolatile memory device without an independent command or signal from the host when the host carries out at least two sub boot operations consecutively for a boot operation after sudden power off (SPO).

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
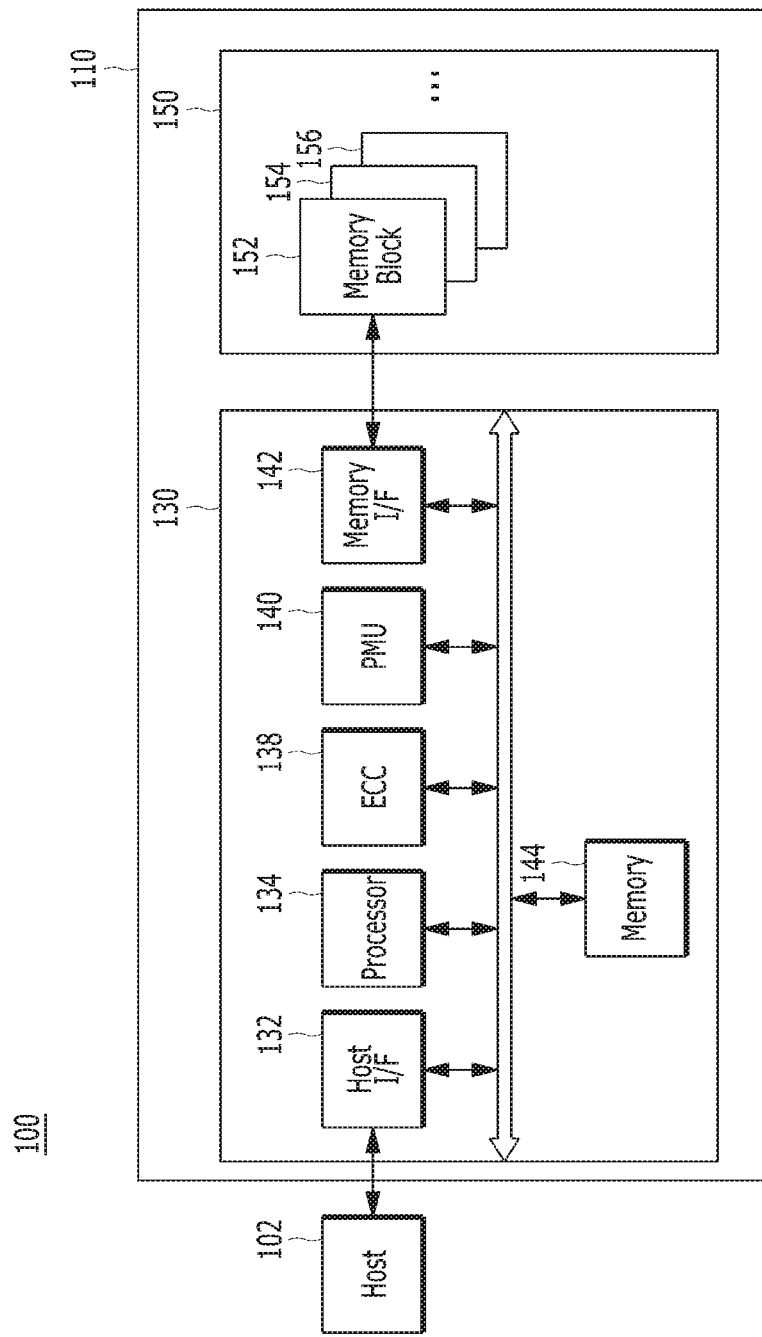
FIG. 1 is a block diagram illustrating a data processing system including a memory system in accordance with an embodiment of the present invention.

Various embodiments of the present invention are described below in more detail with reference to the accompanying drawings. It is noted, however, that the present invention may be embodied in different forms including variations of disclosed embodiments and thus should not be construed as being limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the disclosure, reference to "an embodiment" or the like is not necessarily to only one embodiment, and different references to "an embodiment" or the like are not necessarily to the same embodiment(s).

It will be understood that, although the terms "first", "second", "third", and or the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Various embodiments of the present invention will now be described in detail with reference to the attached drawings.

FIG. 1 is a block diagram illustrating a data processing system 100 including a memory system 100 in accordance with an embodiment of the present invention.

Referring to FIG. 1, the data processing system 100 may include a host 102 and the memory system 110.

By way of example but not limitation, the host 102 may include portable electronic devices such as a mobile phone, MP3 player and laptop computer or non-portable electronic devices such as a desktop computer, a game machine, a TV and a projector.

The host 102 may include at least one OS (operating system). The OS may manage and control overall functions and operations of the host 102. The OS may provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome. The enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of operating systems. The host 102 may execute an OS to perform an operation corresponding to a user's request on the memory system 110.

The memory system 110 may operate to store data for the host 102 in response to a request of the host 102. Non-limiting examples of the memory system 110 may include solid state drive (SSD), multi-media card (MMC), secure digital (SD) card, universal storage bus (USB) device, universal flash storage (UFS) device, compact flash (CF) card, smart media card (SMC), personal computer memory card international association (PCMCIA) card and memory stick. The MMC may include an embedded MMC (eMMC), a reduced size MMC (RS-MMC) and a micro-MMC. The SD card may include a mini-SD card and/or a micro-SD card.

The memory system 110 may be embodied by various types of storage devices. Non-limiting examples of storage devices included in the memory system 110 may include volatile memory devices such as DRAM dynamic random access memory (DRAM) and static RAM (SRAM) and nonvolatile memory devices such as read only memory (ROM), mask ROM (MROM), programmable ROM (PROM), erasable programmable ROM (EPROM) electrically erasable programmable ROM (EEPROM), ferroelectric RAM (FRAM), phase-change RAM (PRAM), magneto-resistive RAM (MRAM), resistive RAM (RRAM) and flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in any of various types of memory systems as described above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card such as a PCMCIA (personal computer memory card international association) card, a CF card, a SMC (smart media card), a memory stick, a MMC including an RS-MMC and a micro-MMC, a SD card including a mini-SD, a micro-SD and a SDHC, or an UFS device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains data stored therein even though power is not supplied. The memory device 150 may store data provided from the host 102 through a write operation. The memory device 150 may output data stored therein to the host 102 through a read operation. The memory device 150 may include a plurality of memory dies (not shown). Each memory die may include a plurality of planes (not shown). Each plane may include a plurality of memory blocks 152 to 156, each of which may include a plurality of pages. Each of the pages may include a plurality of memory cells coupled to a word line. In an embodiment, the memory device 150 may be embodied a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory interface (I/F) 142 such as a NAND flash controller (NFC), and a memory 144, operatively coupled to each other via an internal bus.

The host interface 132 may be configured to process a command and data of the host 102, and may communicate with the host 102 according to one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and instead may output an error correction fail signal.

The ECC component 138 may perform error correction through a coded modulation such as Low Density Parity Check (LDDC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to these error correction techniques. As such, the ECC component 138 may include all circuits, modules, systems or devices for error correction.

The PMU 140 may manage electrical power used and provided in the controller 130.

The memory interface 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory interface 142 may generate a control signal for the memory device 150 and process data, inputted to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory 144 may serve as a working memory of the memory system 110 and the controller 130. The memory 144 may store data for operation of the memory system 110 and the controller 130. The controller 130 may control the memory device 150 to perform read, write, program and erase operations in response to a request from the host 102. The controller 130 may output data read from the memory device 150 to the host 102, and may store data provided from the host 102 into the memory device 150. The memory 144 may store data required for the controller 130 and the memory device 150 to perform these operations.

The memory 144 may be embodied by a volatile memory. By way of example but not limitation, the memory 144 may be embodied by a static random access memory (SRAM) or a dynamic random access memory (DRAM). The memory 144 may be disposed within or externally to the controller 130. FIG. 1 shows the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may use firmware to control overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block among the plurality of memory blocks 152 to 156 included in the memory device 150. The bad block may be a block where a program fail occurs during a program operation, due to a characteristic of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
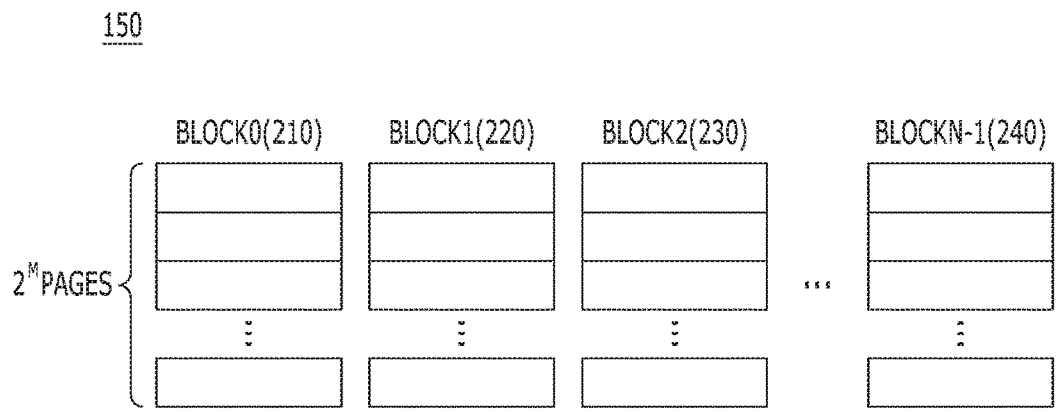
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be of a single level cell (SLC) storing 1-bit data, and/or a multi-level cell (MLC) storing 2- or more bit data. Hence, the memory device 150 may include SLC memory blocks or MLC memory blocks, depending on the number of bits which can be expressed or stored in each of the memory cells in the memory blocks. An SLC memory block may include a plurality of pages which are embodied by memory cells each storing one-bit data, and may generally have high data computing performance and high durability. An MLC memory block may include a plurality of pages which are embodied by memory cells each storing multi-bit data (for example, 2 or more bits). The MLC memory block may generally have a larger data storage space than the SLC memory block, that is, higher integration density. In an embodiment, the memory device 150 may include a plurality of Triple Level Cells (TLC) memory blocks. In yet another embodiment, the memory device 150 may include a plurality of Quadruple Level Cells (QLC) memory blocks. The TCL memory block may include a plurality of pages which are embodied by memory cells each capable of storing 3-bit data. The QLC memory block may include a plurality of pages which are embodied by memory cells, each capable of storing 4-bit data.

Figure 3:
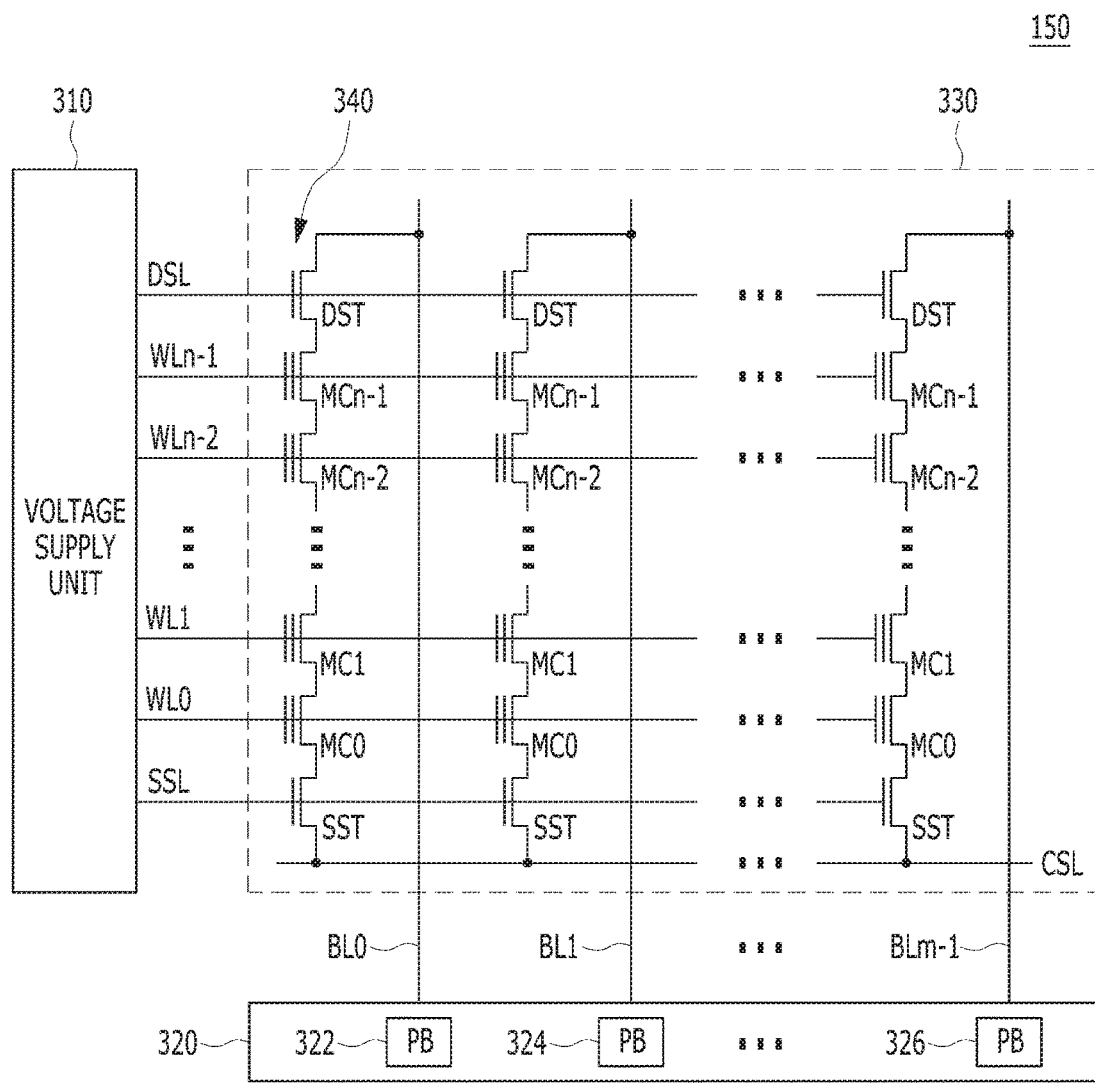
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330, which may correspond to any of the plurality of memory blocks 152 to 156 in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage to bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device.

Figure 4:
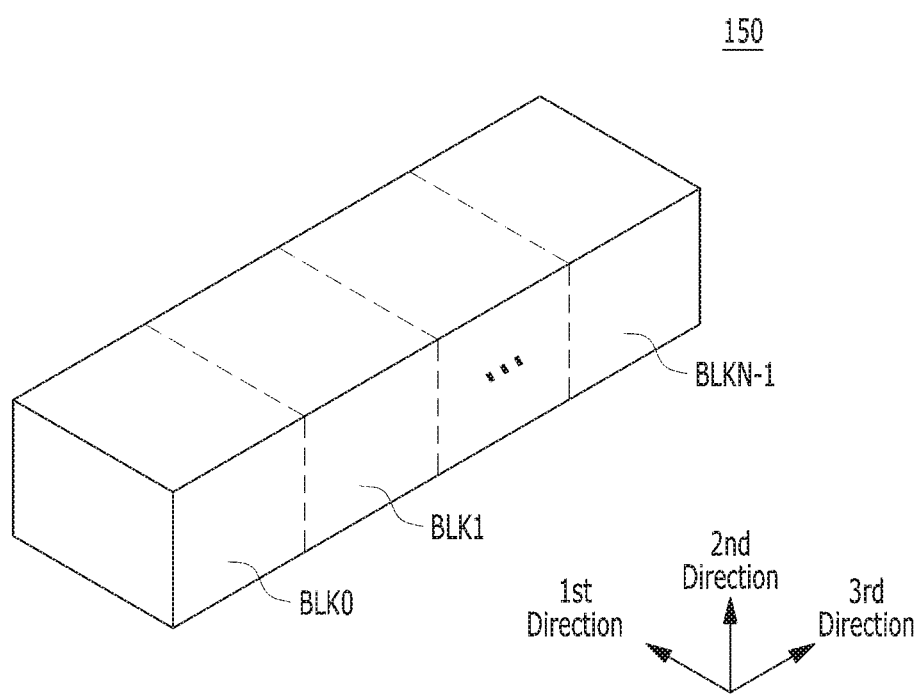
FIG. 4 is a schematic diagram illustrating an exemplary three-dimensional structure of the memory device of FIG. 2.

FIG. 4 is a schematic diagram illustrating an exemplary 3D structure of the memory device 150.

Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5:
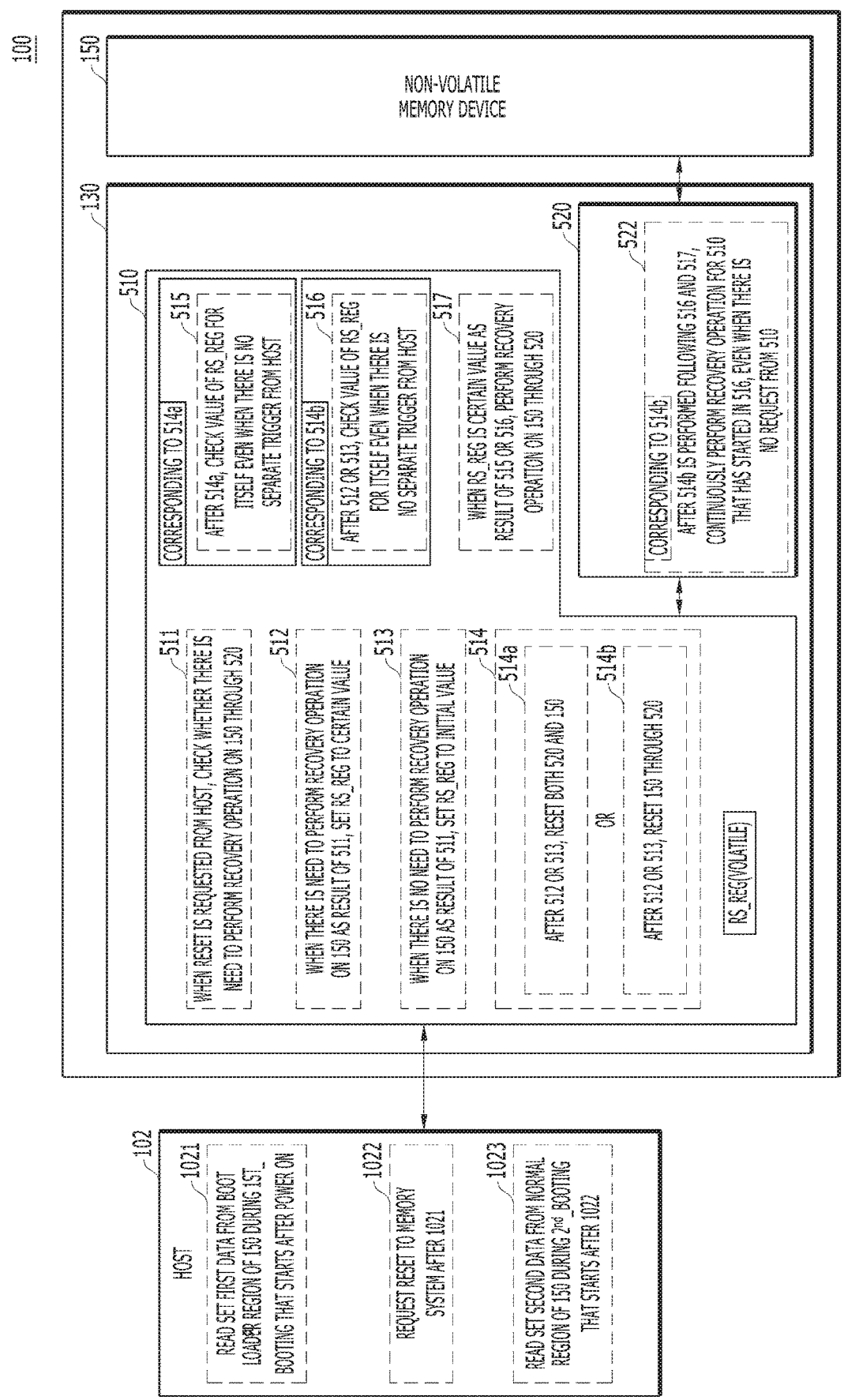
FIG. 5 is a diagram illustrating a data processing system including a memory system in accordance with an embodiment.

FIG. 5 is a diagram illustrating a data processing system including a memory system in accordance with an embodiment.

Referring to FIG. 5, the configuration of the illustrated data processing system 100 including the host 102 and the memory system 110 may be the same as or similar to the configuration of the data processing system 100 shown in FIG. 1.

The memory system 110 includes the controller 130 and the memory device 150, as described with reference to FIG. 1. Furthermore, the controller 130 includes a host controller 510 and a memory controller 520. The host controller 510 includes a recovery selection register RS_REG.

FIG. 5 illustrates a configuration in which only the single nonvolatile memory device 150 is included in the memory system 110. However, this is for clarity of illustration; a larger number of nonvolatile memory devices may be included.

Figure 6:
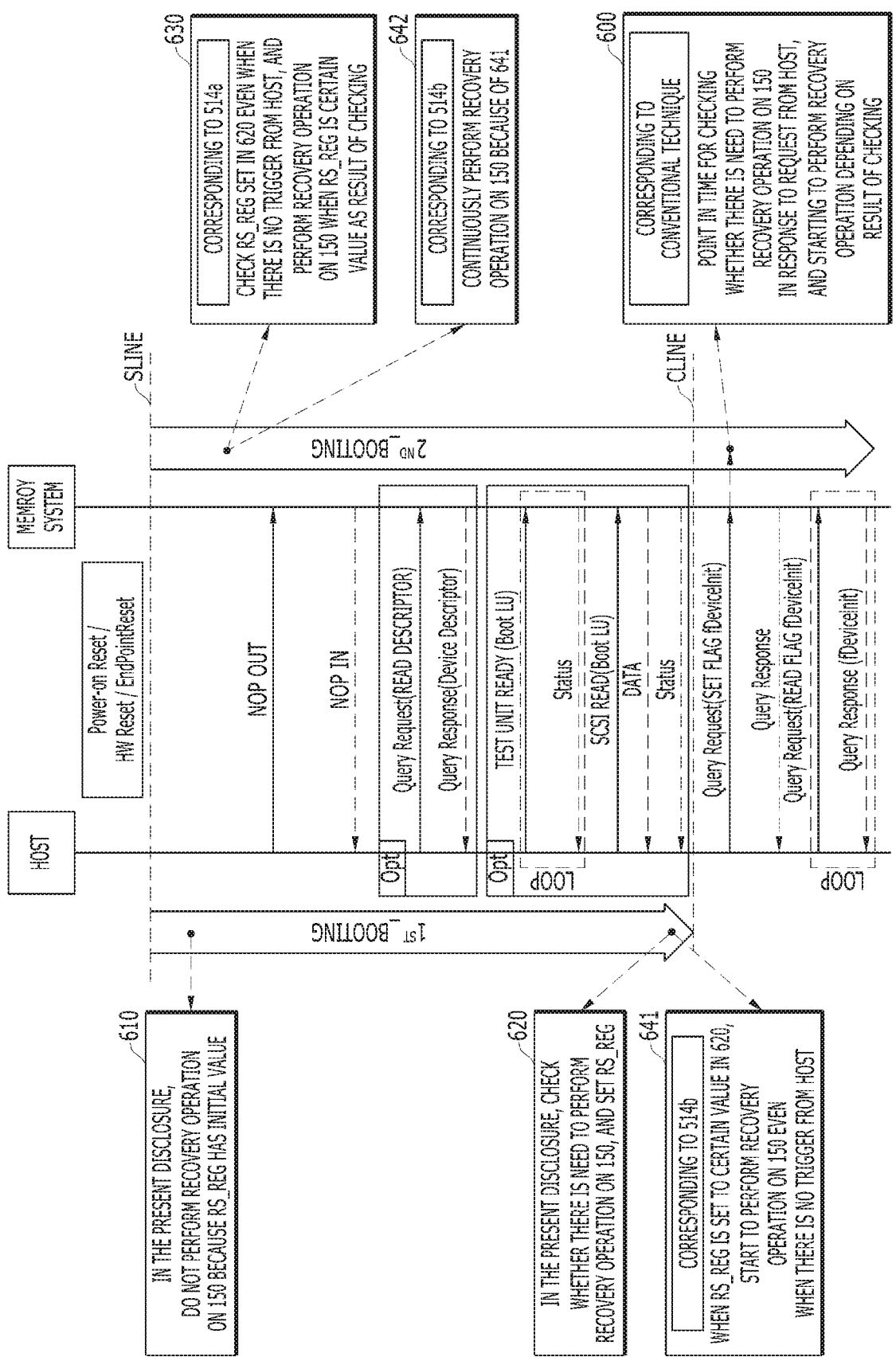
FIG. 6 is a diagram illustrating an operation of the data processing system including the memory system in accordance with the embodiment shown in FIG. 5.

Furthermore, the host interface 132, the processor 134, the ECC component 138, the power management unit 140, the memory interface 142, and the memory 144 illustrated in FIG. 1 as being included in the controller 130 are not illustrated in FIG. 6. However, such omission is made to more clearly illustrate other features of the present invention. The omitted elements may be included in the controller 130.

In detail, the host 102 reads set first data (not shown) from the memory system 110 through a first booting operation 1ST_BOOTING which starts during a power-on operation (step 1021). As such, after the set first data is read from the memory system 110 through the first booting operation 1ST_BOOTING, a reset is requested to the memory system 110 (step 1022). Thereafter, set second data (not shown) is read from the memory system 110 through a second booting operation 2ND_BOOTING which starts after the reset of the memory system 110 (step 1023).

The nonvolatile memory device 150 included in the memory system 110 includes a boot loader region and a normal region. Here, the term "boot loader" may be considered a program needed to operate an operating system to be used in the host 102. In other words, the boot loader may include a program needed to appropriately load the operating system to be used in the host 102.

Here, boot loader program data may be stored in the boot loader region of the nonvolatile memory device 150. Here, basic data of the operating system used by the host 102 may be stored in the normal region, corresponding to the boot loader region, of the nonvolatile memory device 150.

Therefore, the host 102 reads the set first data, i.e., a boot loader program data, from the boot loader region of the nonvolatile memory device 150 through the first booting operation 1ST_BOOTING starting during the power-on operation (step 1021). Furthermore, the host 102 resets the memory system 110 after the first booting operation 1ST_BOOTING is performed. The host 102 reads second data, i.e., the basic data of the operating system, from the normal region of the nonvolatile memory device 150 via the second booting operation 2ND_BOOTING starting after the memory system 110 is reset.

Although not directly shown in FIG. 5, the host 102 resets the memory system 110 after the second booting operation 2ND_BOOTING. The host 102 reads kernel data, i.e. data for a kernel operation on the operating system used by the host 102, from the normal region of the nonvolatile memory device 150 through a kernel booting operation which starts after the memory system 110 is reset.

The above-mentioned booting operation, i.e., including the first booting operation 1ST_BOOTING (step 1021), the first reset operation (step 1022), the second booting operation 2ND_BOOTING (step 1023), the second reset operation (not shown), and the kernel booting operation (not shown), of the host 102 is a type of operation which is performed by most general hosts 102.

It is noted that not only the basic data and the kernel data of the operating system, used in the host 102, but also general user data may be stored in the normal region of the nonvolatile memory device 150.

The memory system 110 includes the volatile recovery selection register RS_REG and the nonvolatile memory device 150. The memory system 110 checks, after being reset, a value of the recovery selection register RS_REG (step 515 or 516). Depending on the value of the recovery selection register RS_REG checked (in step 515 or 516), it is determined whether a recovery operation is to be performed on the nonvolatile memory device 150 (step 517). In the case where a reset is requested from the host 102, the value of the recovery selection register RS_REG is set (step 511, 512, or 513). After the value of the recovery selection register RS_REG is set (step 511, 512, or 513), the nonvolatile memory device 150 is reset (step 514).

In more detail, the memory system 110 further includes the controller 130 to control the operation of the nonvolatile memory device 150 under control of the host 102. The controller 130 includes the host controller 510, such as a host interface configured to process an operation with the host 102, and the memory controller 520 which is coupled with the host controller 510. The memory controller 520 may function as a memory interface configured to process an operation with the nonvolatile memory device 150. Here, the recovery selection register RS_REG is included in the host controller 510.

In the case where a reset is requested from the host 102, the host controller 510 with the memory controller 520 determines or checks whether a recovery operation on the nonvolatile memory device 150 is needed (step 511).

When a recovery operation on the nonvolatile memory device 150 is needed, as a result of the checking operation (step 511), the host controller 510 sets the value of the recovery selection register RS_REG to a certain value (step 512).

On the other hand, when a recovery operation on the nonvolatile memory device 150 is not needed, as a result of the checking operation (step 511), the host controller 510 sets the value of the recovery selection register RS_REG to an initial value (step 513).

After setting the recovery selection register RS_REG to the certain value or the initial value (step 512 or 513), the host controller 510 resets the memory system 110.

Two methods of resetting, by the host controller 510, the memory system 110 in response to a request of the host 102 are described below.

In a first method, the host controller 510 directly resets both the memory controller 520 and the nonvolatile memory device 150 (step 514a).

In a second method, the host controller 510 resets only the is nonvolatile memory device 150 through the memory controller 520 (step 514b).

A difference between the first method and the second method is whether the memory controller 520 is reset along with the reset of the nonvolatile memory device 150 when the memory system 110 is reset in response to the request of the host 102. In other words, both the memory controller 520 and the nonvolatile memory device 150 are reset in the first method, while only the nonvolatile memory device 150 is reset, without resetting the memory controller 520, in the second method.

The difference between the first method and the second method is attributable to the diversity of configurations that the host 102 may embody. That is, as described with reference to FIG. 1, the memory system 110 may be used in different kinds of hosts 102. Thus, depending on the kind of host 102, the memory system 110 may be reset according to the first method, or the memory system 110 may be reset according to the second method. Generally, the operation of resetting the memory system 110 according to the first method is referred to as an operation of resetting the memory system 110 by a hardware reset method. The operation of resetting the memory system 110 according to the second method is referred to as an operation of resetting the memory system 110 by an endpoint reset method.

An operation of the memory controller 520 corresponding to the case (step 514a) where the host controller 510 resets both the memory controller 520 and the nonvolatile memory device 150 according to the first method is described below.

First, after both the memory controller 520 and the nonvolatile memory device 150 have been reset according to the first method (step 514a), the host controller 510 checks for itself the value of the recovery selection register RS_REG (step 515), even in the absence of an independent trigger from the host 102.

Subsequently, in the case where, as a result of the checking operation (step 515), the value of the recovery selection register RS_REG is the certain value, the host controller 510 performs a recovery operation on the nonvolatile memory device 150 through the memory controller 520 (step 517).

On the contrary, in the case where, as a result of the checking operation (step 515), the value of the recovery selection register RS_REG is the initial value, the host controller 510 does not perform a recovery operation on the nonvolatile memory device 150.

An operation of the memory controller 520 corresponding to the case (step 514b) where the host controller 510 resets only the nonvolatile memory device 150 according to the second method is described below.

First, after the operation (step 512 or 513) has been performed before the operation (step 514b) is performed, the host controller 510 checks for itself the value of the recovery selection register RS_REG (step 516), even in the absence of an independent trigger from the host 102.

Subsequently, in the case where, as a result of the checking operation (step 516), the value of the recovery selection register RS_REG is the certain value, the host controller 510 performs a recovery operation on the nonvolatile memory device 150 through the memory controller 520 (step 517).

On the contrary, in the case where, as a result of the checking operation (step 516), the value of the recovery selection register RS_REG is the initial value, the host controller 510 does not perform a recovery operation on the nonvolatile memory device 150.

Here, the memory controller 520 is not reset by the host controller 510 during the operation (step 514b). Therefore, the recovery operation for the nonvolatile memory device 150, which has started in response both to the operation 512 performed prior to the operation (step 514b) and to the operations (steps 516 and 517), is not reset.

Consequently, after the operation (step 514b) has been performed following the operations 512, 516, 517, the memory controller 520 continuously performs, on the nonvolatile memory device 150, the recovery operation that has started in the operation (step 516), even when there is no request from the host controller 510 (step 522).

The above-mentioned recovery selection register RS_REG includes information having at least one bit. For example, the initial value of the recovery selection register RS_REG may be '0', while the certain value thereof may be '1'. Of course, this is only one example, and information having a larger number of bits may be included in the recovery selection register RS_REG.

FIG. 6 is a diagram illustrating an operation of the data processing system including the memory system in accordance with the embodiment shown in FIG. 5.

Figure 7:
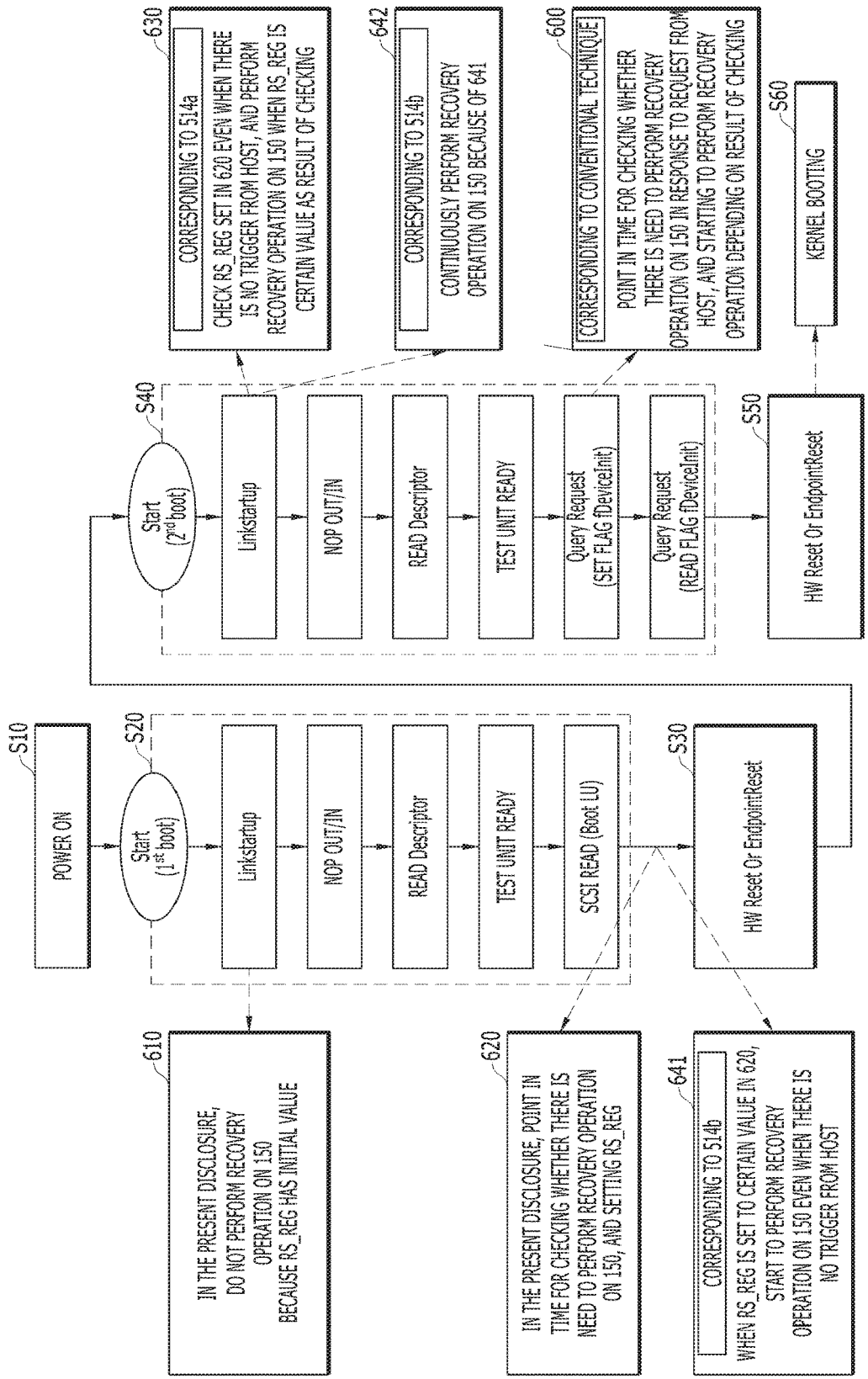
FIG. 7 is a diagram illustrating a flowchart of the operation of the data processing system illustrated in FIG. 6.

FIG. 7 is a diagram illustrating a flowchart of the operation of the data processing system illustrated in FIG. 6.

Referring to FIGS. 6 and 7, an operating method of the memory system 110 in accordance with the embodiment during the booting operation of the host 102 described with reference to FIG. 5 is described.

Referring to FIG. 7, as described with reference to FIG. 5, in the booting operation of the host 102, a first booting operation 1ST_BOOTING (step S20) is performed after a power-on operation (step S10), and the memory system 110 is thereafter reset (at step S30). After the memory system 110 has been reset (at step S30), a second booting operation 2ND_BOOTING (step S40) is performed, and the memory system 110 is thereafter reset (at step S50). After the memory system 110 has been reset (at step S50), a kernel booting operation is performed (at step S60).

In detail, the first booting operation 1ST_BOOTING (step S20) during the booting operation of the host 102 is described below with reference to FIGS. 6 and 7.

After the power-on operation (step S10), an operation (such as Linkstartup, NOP OUT, NOP IN) of checking whether a signal may be transmitted between the host 102 and the memory system 110 may be performed.

Subsequently, an operation (such as READ Descriptor, Device Descriptor) of checking whether it is possible to read data from the nonvolatile memory device 150 included in the memory system 110 may be performed.

Thereafter, an operation (such as TEST UNIT READY) of reading a test data from the boot loader region of the nonvolatile memory device 150 and checking whether the test data is normally accessed and read may be performed.

Thereafter, an operation (such as SCSI READ) of reading a boot loader program data, i.e., set first data, from the boot loader region of the nonvolatile memory device 150 may be performed.

If the first booting operation 1ST_BOOTING is completed, through the above-mentioned process, the memory system 110 may be reset (as shown by "HW Reset or EndPointReset", at step S30). If the reset HW Reset or EndPointReset (step S30) of the memory system 110 is completed, a second booting operation 2ND_BOOTING (step S40) may be performed.

The second booting operation 2ND_BOOTING (step S40) is described in detail. After the reset (such as HW Reset or EndPointReset, step S30) of the memory system 110, an operation (such as Linkstartup, NOP OUT, NOP IN) of checking whether a signal may be transmitted between the host 102 and the memory system 110 may be performed.

Subsequently, an operation (such as READ Descriptor, Device Descriptor) of checking whether it is possible to read data from the nonvolatile memory device 150 included in the memory system 110 may be performed.

Thereafter, an operation (such as TEST UNIT READY) of reading test data from the normal region of the nonvolatile memory device 150 and checking whether the test data is accessed and read may be performed.

Subsequently, an operation (such as QueryRequest{SET FLAG fDeviceInit, READ FLAG fDeviceInit}) of reading the basic data of the operating system to be used in the host 102 from the normal region of the nonvolatile memory device 150 may be performed.

If the second booting operation 2ND_BOOTING (step S40) is normally completed through the above-mentioned process, the memory system 110 may be reset (as shown by "HW Reset or EndPointReset", at step S50). If the reset HW Reset or EndPointReset (step S50) of the memory system 110 is completed, a kernel booting operation KERNEL BOOTING (step S60) may be performed.

In summary, when the power-on operation (step S10) is performed after a power-off operation, the host 102 performs the first booting operation 1ST_BOOTING (step S20). After the first booting operation 1ST_BOOTING (step S20) has been completed, the host 102 resets the memory system 110 (at step S30). Subsequently, the host 102 performs the second booting operation 2ND_BOOTING (step S40). After the second booting operation 2ND_BOOTING (step S40) has been completed, the host 102 resets the memory system 110 again (at step S50). Thereafter, the host 102 performs the kernel booting operation (at step S60). Here, as shown in the drawing, it will be understood that the first booting operation 1ST_BOOTING (step S20) and the second booting operation 2ND_BOOTING (step S40) of the host 102 are performed in a similar manner, with differences being the kind of data to be read and the region from which data is to be read.

Here, in the case where the power-on operation is performed after sudden power off (SPO) has occurred rather than being performed after the normal power-off operation, the memory system 110 should perform a recovery operation on the nonvolatile memory device 150 in the memory system 110. In other words, the memory system 110 should check whether SPO has occurred, and perform the recovery operation on the nonvolatile memory device 150 if it is determined that the SPO has occurred.

As described above, it will be understood that the host 102 separately and sequentially performs the first booting operation 1ST_BOOTING (step S20) and the second booting operation 2ND_BOOTING (step 540), and resets the memory system 110 (at step S30) between the first booting operation 1ST_BOOTING (step S20) and the second booting operation 2ND_BOOTING (step S40).

Here, during the time in which the first booting operation 1ST_BOOTING (step S20) of the host 102 is performed, the memory system 110 should not perform the recovery operation. This is because the operation (SCSI READ) of reading data from the boot loader region of the nonvolatile memory device 150 is included in the first booting operation 1ST_BOOTING (step S20). That is, the recovery operation on the nonvolatile memory device 150 may affect the operation (SCSI READ) of reading data from the boot loader region. Therefore, the recovery operation of the memory system 110 should be performed while the second booting operation 2ND_BOOTING (step S40) is performed by the host 102. In other words, during the second booting operation 2ND_BOOTING (step S40) performed by the host 102, the memory system 110 checks whether the SPO has occurred, and performs the recovery operation on the nonvolatile memory device 150 depending on the result of the checking.

However, in a conventional memory system, the memory system does not check for itself whether the host performs a first booting operation, such as 1ST_BOOTING, or a second booting operation, such as 2ND_BOOTING. In other words, as shown in the drawing, at a start point SLINE at which time the memory system is reset, regardless of whether the reset results from the power-on operation or is the reset, such as HW Reset or EndPointReset, performed between the first booting operation and the second booting operation, the memory system recognizes the two kinds of resets as the same reset operation, so that the detailed operations of the first booting operation and the second booting operation that are performed between the host and the memory system are substantially similar to each other from the start time SLINE to a common time CLINE. Consequently, in the conventional memory system, it is impossible to determine or recognize whether the host is performing either the first booting operation or the second booting operation.

Thus, in the conventional technique, in response to a request entered from the host for the operation (such as QueryRequest{SET FLAG fDeviceInit, READ FLAG fDeviceInit}) for reading the basic data of the operating system from the normal region of the nonvolatile memory device during the second booting operation, the memory system checks whether SPO has occurred, and performs a recovery operation on the nonvolatile memory device depending on a result of the checking (600). However, in the case where the memory system performs the recovery operation in the above described conventional manner (600), it is likely that the recovery operation may not be completed because there is not enough time needed to perform the recovery operation.

On the other hand, the memory system 110, and the data processing system 100 including the memory system 110, in accordance with the embodiment described with reference to FIG. 5, overcomes the above-described problem of the conventional memory system.

In detail, as described with reference to FIG. 5, the memory system 110 in accordance with an embodiment includes the volatile recovery selection register RS_REG.

Furthermore, the memory system 110 unconditionally checks the value of the recovery selection register RS_REG after a reset operation, and selects whether to perform the recovery operation on the nonvolatile memory device 150 (step 610, 630, 641, 642). In other words, the memory system 110 unconditionally checks the value of the recovery selection register RS_REG regardless of which one of a power-on reset operation and a reset operation is performed in response to a request from the host 102. As a result of the checking, if the recovery selection register RS_REG has the initial value, the recovery operation is not performed on the nonvolatile memory device 150. As a result of the checking, if the recovery selection register RS_REG has the certain value, the recovery operation is performed on the nonvolatile memory device 150.

The memory system 110 may select or determine whether the recovery operation is performed on the nonvolatile memory device 150 using the value of the recovery selection register RS_REG in the memory system 110. This is enabled because the recovery selection register RS_REG is established as follows.

First, only when the power-on operation is performed after the power-off operation, the host 102 performs the first booting operation 1ST_BOOTING (step 520).

Therefore, during the period for which the host 102 performs the first booting operation 1ST_BOOTING (step 520), the recovery selection register RS_REG having volatile characteristics is unconditionally set to the initial value.

Thus, when the host 102 performs the first booting operation 1ST_BOOTING (step 520), the memory system 110 does not perform the recovery operation on the nonvolatile memory device 150.

Thereafter, when the host 102 transmits a reset request to the memory system 110 after the first booting operation 1ST_BOOTING (step S20) has been completed, the memory system 110 checks whether there is a need to perform the recovery operation on the nonvolatile memory device 150, and sets the value of the recovery selection register RS_REG to a certain value depending on a result of the checking (step 620). When there is a need to perform the recovery operation on the nonvolatile memory device 150 while the host 102 performs the second booting operation 2ND_BOOTING (step 540) after the memory system 110 has been reset (at step 530), the recovery selection register RS_REG may have the certain value (step 630, 641, or 642).

Therefore, while the host 102 performs the second booting operation 2ND_BOOTING (step S40), the recovery selection register is RS_REG included in the memory system 110 may selectively have the initial value or the certain value.

Consequently, while the host 102 performs the second booting operation 2ND_BOOTING (step S40), the memory system 110 selects or determines whether the recovery operation is performed on the nonvolatile memory device 150 depending on the result of checking the value of the recovery selection register RS_REG (step 630, 641, or 642).

Through the recovery selection register RS_REG, the memory system 110 in accordance with an embodiment may check the period during which the host 102 performs the second booting operation 2ND_BOOTING (step 540). Even when there is no independent or separate trigger from the host 102 during the period of the second booting operation 2ND_BOOTING (step S40), in other words, even before the operation of making a request for the operation (such as QueryRequest{SET FLAG fDeviceInit, READ FLAG fDeviceInit}) to read the basic data of the operating system from the normal region of the nonvolatile memory device 150 is performed, the memory system 110 may perform for itself the recovery operation on the nonvolatile memory device 150 (step 640, 641, 642).

In more detail, when a request for the reset operation is received from the host 102, the host controller 510 in the controller 130 of the memory system 110 determines or selects whether to perform the recovery operation on the nonvolatile memory device 150 through the memory controller 520 (step 610, 630, 641, 642). In other words, the host controller 510 unconditionally always checks the value of the recovery selection register RS_REG regardless of which one of a power-on reset operation and a reset operation is performed in response to a request from the host 102. As a result of the checking, when the recovery selection register RS_REG has the initial value, the recovery operation is not performed on the nonvolatile memory device 150. As a result of the checking, when the recovery selection register RS_REG has the certain value, the recovery operation is performed on the nonvolatile memory device 150 through the memory controller 520.

The reason why the host controller 510 may select whether the recovery operation is performed on the nonvolatile memory device 150 using the value of the recovery selection register RS_REG is because the recovery selection register RS_REG is set as follows.

First, only when the power-on operation (step 510) is performed after the power-off operation, the host 102 performs the first booting operation 1ST_BOOTING (step S20).

Therefore, during the time in which the host 102 performs the first booting operation 1ST_BOOTING (step S20), the recovery selection register RS_REG having volatile characteristics is initialized, i.e., set to the initial value.

Thus, during the time in which the host 102 performs the first booting operation 1ST_BOOTING (step 520), the host controller 510 does not make a request for the recovery operation for the nonvolatile memory device 150 (step 610).

Thereafter, when the host 102 transmits a reset request to the host controller 510 after the first booting operation 1ST_BOOTING (step S20) has been completed, the host controller 510 checks whether there is a need to perform the recovery operation on the nonvolatile memory device 150 through the memory controller 520, and then sets the value of the recovery selection register RS_REG to a certain value depending on a result of the checking (step 620). When there is a need to perform the recovery operation on the nonvolatile memory device 150 when the host 102 performs the second booting operation 2ND_BOOTING (step 540) after the memory system 110 has been reset, the recovery selection register RS_REG may have the certain value (step 630, 641, 642).

Therefore, during the time in which the host 102 performs the second booting operation 2ND_BOOTING (step S40), the recovery selection register RS_REG in the host controller 510 may selectively have the initial value or the certain value.

Consequently, during the second booting operation 2ND_BOOTING (step S40), the host controller 510 selects or determines whether the recovery operation is performed on the nonvolatile memory device 150 depending on the result of checking the value of the recovery selection register RS_REG (step 630, 641, 642).

As described with reference to FIG. 5, there may be two methods to reset the memory system 110. The two reset methods include the first method 514a in which the host controller 510 directly resets both the memory controller 520 and the nonvolatile memory device 150, and the second method 514b in which the host controller 510 resets only the nonvolatile memory device 150 through the memory controller 520. In addition, depending on the method of resetting the memory system 110, the recovery operation of the nonvolatile memory device 150 by the host controller 510 may vary.

First, in the case of the first reset method 514a, both the memory controller 520 and the nonvolatile memory device 150 are reset during the reset operation (step S30) performed after the first booting operation 1ST_BOOTING (step S20) of the host 102.

Therefore, when the host 102 starts to perform the second booting operation 2ND_BOOTING after both the memory controller 520 and the nonvolatile memory device 150 have been reset (at step S30), the host controller 510 checks for itself the value of the recovery selection register RS_REG even without an independent trigger from the host 102. As a result of the checking, when the recovery selection register RS_REG has the certain value, the host controller 510 performs the recovery operation on the nonvolatile memory device through the memory controller 520 (step 630). As a result of the checking, when the recovery selection register RS_REG has the initial value, the host controller 510 does not perform the recovery operation on the nonvolatile memory device 150.

In the case of the second reset method 514b, only the nonvolatile memory device 150, not the memory controller 520, is reset during the reset operation (step S30) performed after the first booting operation 1ST_BOOTING (step S20) of the host 102.

Therefore, at a time before the reset operation (step S30) corresponding to the second method 514b is performed, i.e., at a time at which the operation 620 of checking whether the recovery operation is needed in the nonvolatile memory device 150 is performed in response to a reset request from the host 102, the host controller 510 starts to perform the recovery operation for the nonvolatile memory device 150 through the memory controller 520 even without an independent trigger from the host 102 when the recovery selection register RS_REG is set to the certain value as a result of the operation 620 (step 641). When the recovery selection register RS_REG is set to the initial value as the result of the operation 620 at a time before the reset operation (step 530) corresponding to the second method 514b is performed, the host controller 510 does not start the recovery operation for the nonvolatile memory device 150.

After the memory controller 520 has started the recovery operation for the nonvolatile memory device 150 through the operation 641, before the reset operation (step 530) corresponding to the second method 514b is performed, the memory controller 520 is not reset even when such reset operation (step 530) is performed. Therefore, after the reset operation (step 530) corresponding to the second method 514b has been performed, the memory controller 520 continuously performs the recovery operation on the nonvolatile memory device 150 that has started through the operation 641 (step 642).

In summary, the host controller 510 in accordance with an embodiment may check, through the recovery selection register RS_REG, the time in which the host 102 performs the second booting operation 2ND_BOOTING (step 540). Thereby, even when there is no separate or independent trigger from the host 102 during the second booting operation 2ND_BOOTING (step S40), in other words, even before making a request for the operation (such as QueryRequest{SET FLAG fDeviceInit, READ FLAG fDeviceInit}) of reading the basic data of the operating system from the normal region of the nonvolatile memory device 150, the host controller 510 may perform for itself the recovery operation on the nonvolatile memory device 150 through the memory system 110 (step 640, 641, or 642).

Figure 8:
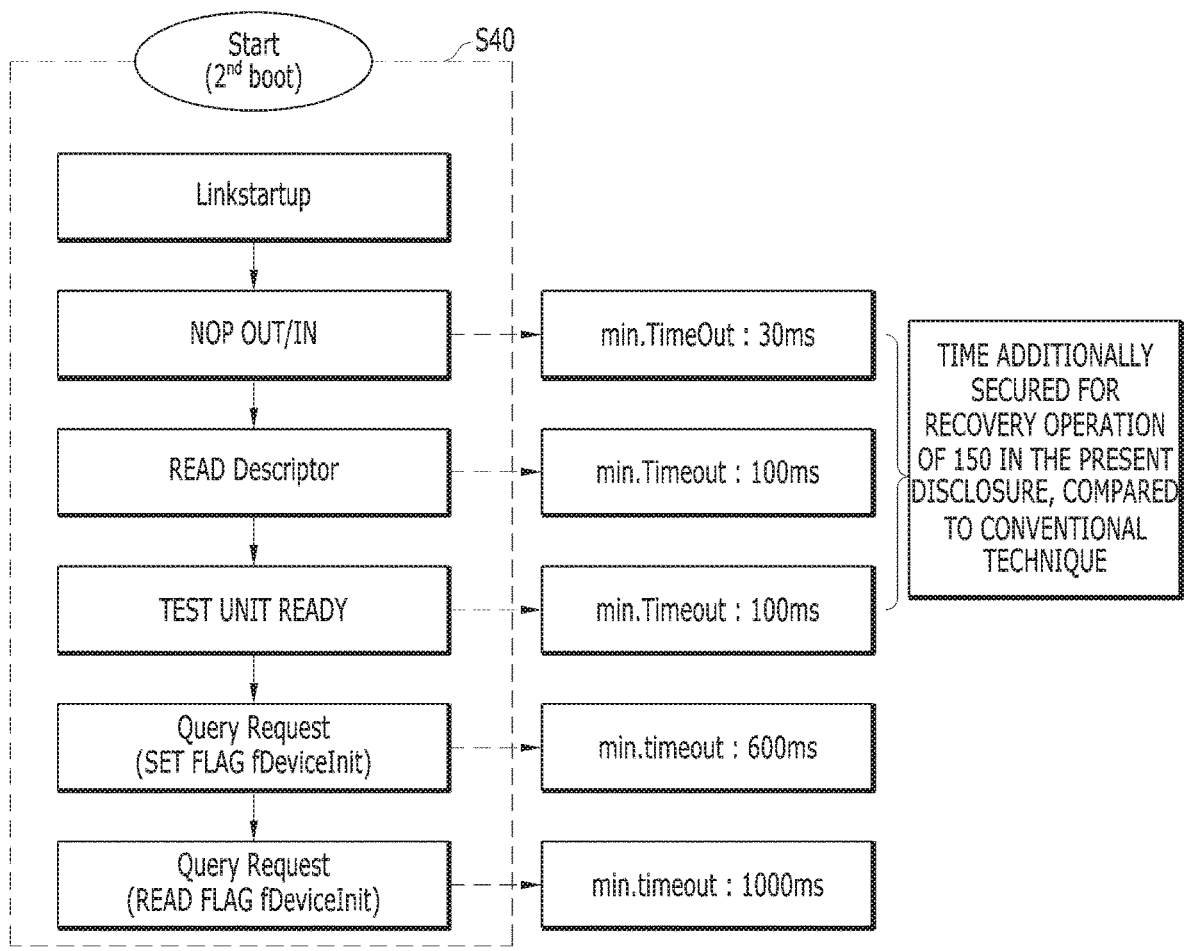
FIG. 8 is a diagram illustrating the effect of the data processing system including the memory system in accordance with the embodiment shown in FIG. 5.

FIG. 8 is a diagram illustrating the effect of the data processing system including the memory system in accordance with the embodiment shown in FIG. 5.

Referring to FIG. 8, there is illustrated in detail the second booting operation 2ND_BOOTING (step S40) of the host 102 described with reference to FIGS. 6 and 7.

In detail, the operation (such as Linkstartup, NOP OUT, NOP IN) of checking whether a signal may be transmitted between the host 102 and the memory system 110 is performed. By way of example but not limitation, about 30 ms based on the minimum time (min-time) may be allocated as a required time of the host 102 needed for the operation (such as Linkstartup, NOP OUT, NOP IN). In other words, in a case where there is no response from the memory system 110 until 30 ms elapses from the start of the operation (such as Linkstartup, NOP OUT, NOP IN), the host 102 may determine that the operation (such as Linkstartup, NOP OUT, NOP IN) has failed.

Subsequently, the operation (such as READ Descriptor, Device Descriptor) of checking whether it is possible to read data from the nonvolatile memory device 150 in the memory system 110 is performed. By way of example but not limitation, a required time of the host 102 needed for the operation (such as READ Descriptor, Device Descriptor) may be about 100 ms based on the minimum time (min-time). In other words, in the case where there is no response from the memory system 110 until 100 ms elapses from the start of the operation (such as READ Descriptor, Device Descriptor), the host 102 may determine that the operation (such as READ Descriptor, Device Descriptor) has failed.

Thereafter, the operation (such as TEST UNIT READY) of reading test data from the normal region of the nonvolatile memory device 150 and checking whether the test data is read is performed. By way of example but not limitation, a required time of the host 102 needed for the operation (such as TEST UNIT READY) may be 100 ms based on the minimum time (min-time). In other words, in a case where there is no response from the memory system 110 until 100 ms elapses from the start of the operation (such as TEST UNIT READY), the host 102 may determine that the operation (such as TEST UNIT READY) has failed.

Subsequently, the operation (such as QueryRequest{SET FLAG fDeviceInit, READ FLAG fDeviceInit}) of reading the basic data of the operating system to be used in the host 102 from the normal region of the nonvolatile memory device 150 is performed. By way of example but not limitation, a required time of the host 102 needed for the operation (such as QueryRequest{SET FLAG fDeviceInit, READ FLAG fDeviceInit}) may be 1600 ms (=600 ms+1000 ms) based on the minimum time (min-time). In other words, in a case where there is no response from the memory system 110 until 1600 ms elapses from the start of the operation (such as QueryRequest{SET FLAG fDeviceInit, READ FLAG fDeviceInit}), the host 102 may determine that the operation (such as QueryRequest{SET FLAG fDeviceInit, READ FLAG fDeviceInit}) has failed.

As described with reference to FIGS. 5 to 7, the memory system 110 in accordance with embodiments may perform the recovery operation on the nonvolatile memory device 150 from a start time of the period for which the host 102 performs the second booting operation 2ND_BOOTING (step 540). For example, based on the minimum required time (min-time) of the host 102, the host 102 may wait for 1830 ms after the recovery operation of the nonvolatile memory device 150 has started in the memory system 110.

On the other hand, a memory system according to the conventional technique may perform the recovery operation of a nonvolatile memory device only when the operation (such as QueryRequest{SET FLAG fDeviceInit, READ FLAG fDeviceInit}) of reading the basic data of the operating system to be used in a host from the normal region of the nonvolatile memory device is performed in response to a request of the host. For example, based on the minimum required time (min-time) of the host, the host may wait for only 1600 ms after the recovery operation of the nonvolatile memory device has started in the memory system.

That is, as shown in FIG. 8, in the memory system 110 in accordance with an embodiment, the time allocated to perform the recovery operation of the nonvolatile memory device 150 may be increased by a time needed to perform the operations (such as Linkstartup, NOP OUT, NOP IN, READ Descriptor, Device Descriptor, TEST UNIT READY) after the host 102 has started the second booting operation 2ND_BOOTING (step S40), e.g., by 230 ms, compared to that of the conventional technique.

FIGS. 9 to 17 are diagrams schematically illustrating exemplary applications of the data processing system of FIG. 1.

Figure 9:
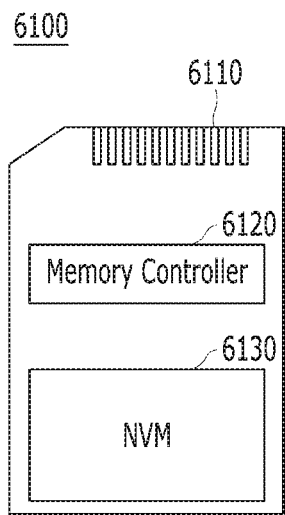
FIGS. 9 to 17 are diagrams schematically illustrating exemplary applications of the data processing system of FIG. 1.

FIG. 9 is a diagram schematically illustrating another example of the data processing system including the memory system in accordance with an embodiment. FIG. 9 schematically illustrates a memory card system to which the memory system may be applied.

Referring to FIG. 9, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. For example, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be so integrated to form a solid state drive (SSD). Also, the memory controller 6120 and the memory device 6130 may form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

Figure 10:
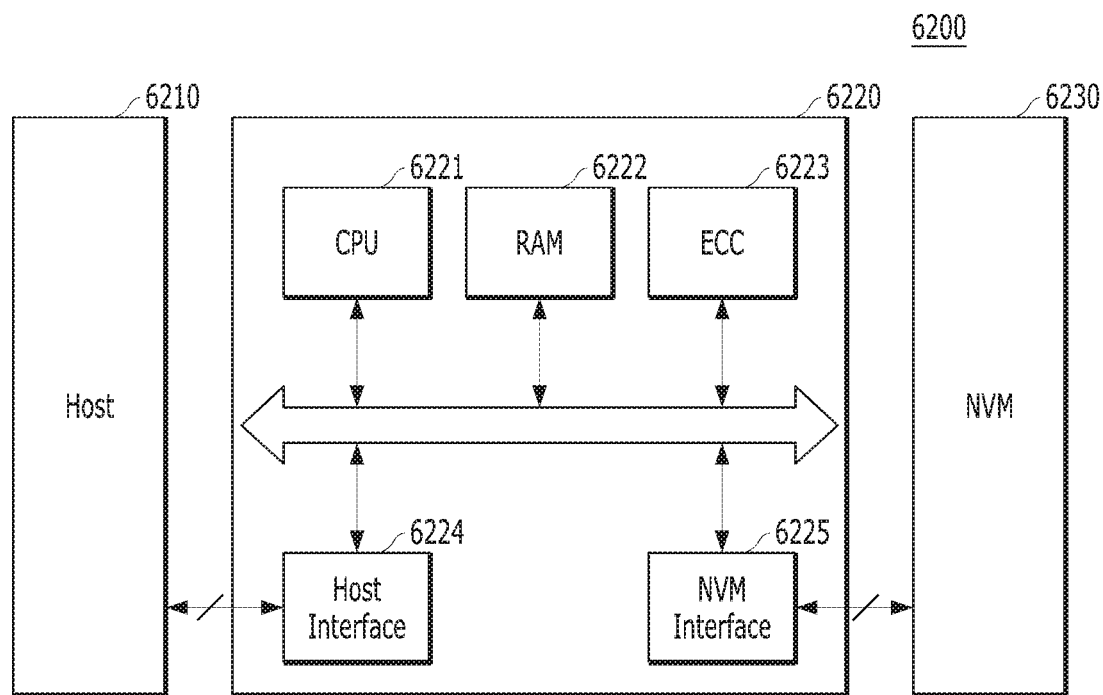

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may transmit data to, or receive data from, the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and exchange data with the external device. As the memory controller 6220 is configured to communicate with the external device through one or more of various communication protocols, the memory system and the data processing system in accordance with an embodiment may be applied to wired/wireless electronic devices, particularly a mobile electronic device.

Figure 11:
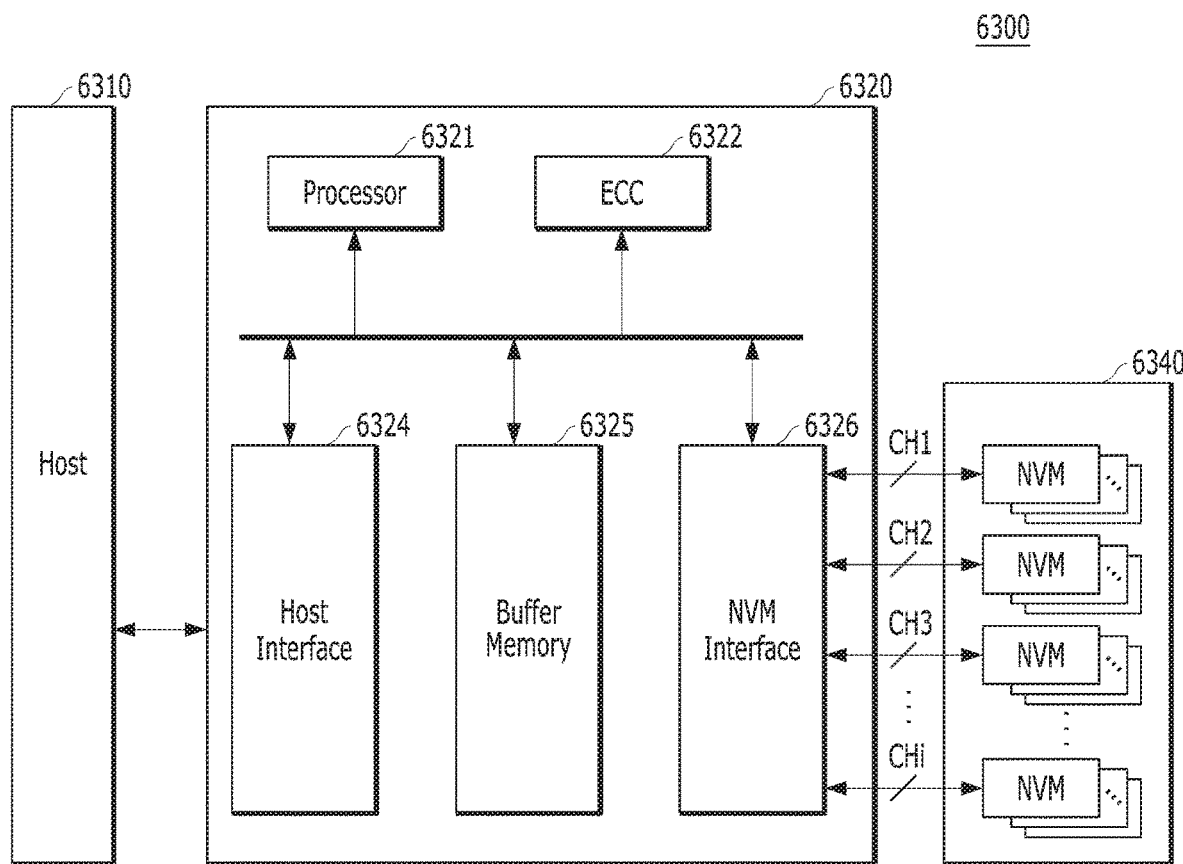

FIG. 11 is a diagram schematically illustrating another example of the data processing system including the memory system in accordance with an embodiment. FIG. 11 schematically illustrates an SSD to which the memory system may be applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 10 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 12:
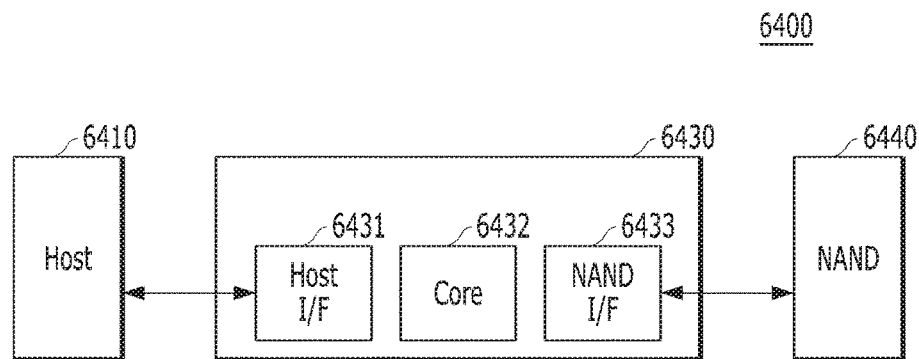

FIG. 12 is a diagram schematically illustrating another example of the data processing system including the memory system in accordance with an embodiment. FIG. 12 schematically illustrates an embedded Multi-Media Card (eMMC) to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with embodiments. FIGS. 13 to 16 schematically illustrate UFS (Universal Flash Storage) systems to which the memory system may be applied.

Referring to FIGS. 13 to 16, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, UFDs, MMC, SD, mini-SD, and micro-SD.

Figure 13:
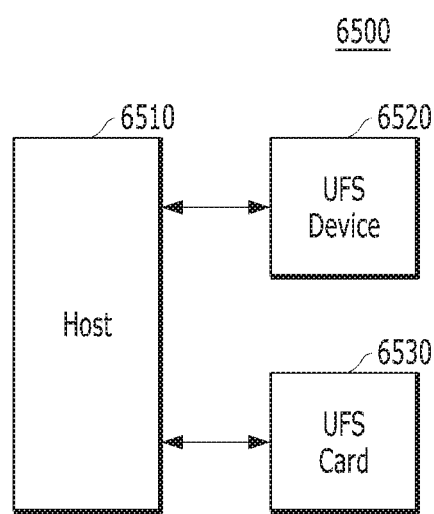

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. The host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, the configuration in which one UFS device 6520 and one UFS card 6530 are connected to the host 6510 is depicted. However, a plurality of UFS devices and UFS cards may be connected in parallel or in the form of a star to the host 6410. A plurality of UFS cards may be connected in parallel or in the form of a star to the UFS device 6520 or connected in series or in the form of a chain to the UFS device 6520.

Figure 14:
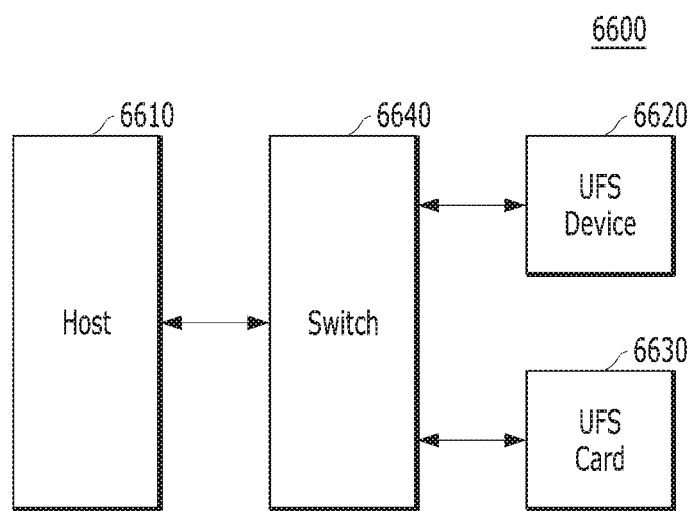

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, the configuration in which one UFS device 6620 and one UFS card 6630 are connected to the switching module 6640 is depicted. However, a plurality of UFS devices and UFS cards may be connected in parallel or in the form of a star to the switching module 6640. A plurality of UFS cards may be connected in series or in the form of a chain to the UFS device 6620.

Figure 15:
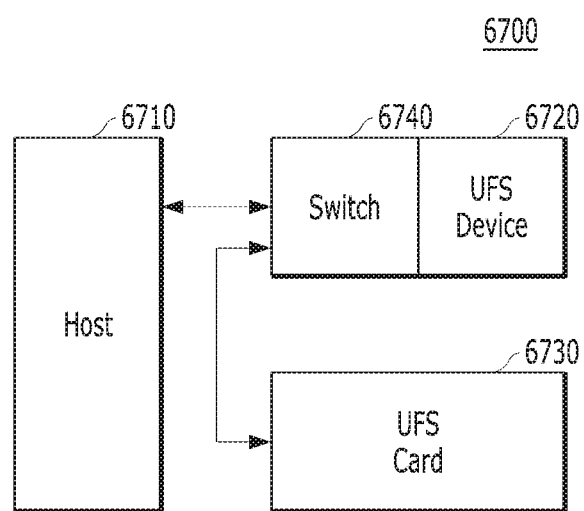

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the illustrated embodiment, the configuration in which one UFS device 6720 and one UFS card 6730 are connected to the switching module 6740 is depicted. However, a plurality of modules each including the switching module 6740 and the UFS device 6720 may be connected in parallel or in the form of a star to the host 6710, or connected in series or in the form of a chain to each other. Furthermore, a plurality of UFS cards may be connected in parallel or in the form of a star to the UFS device 6720.

Figure 16:
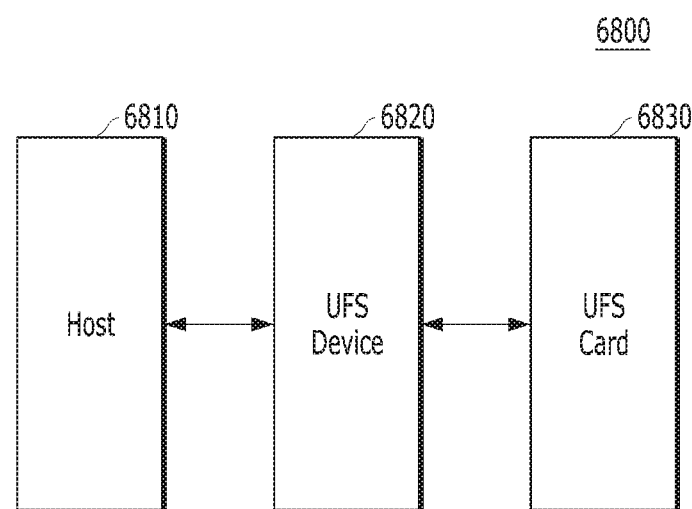

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, e.g., through a target ID (Identifier) switching operation. The host 6810 and the UFS card 6830 may communicate with each other through target ID switching between the M-PHY and UniPro modules of the UFS device 6820. In the illustrated embodiment, the configuration in which one UFS device 6820 is connected to the host 6810 and one UFS card 6830 is connected to the UFS device 6820 is depicted. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
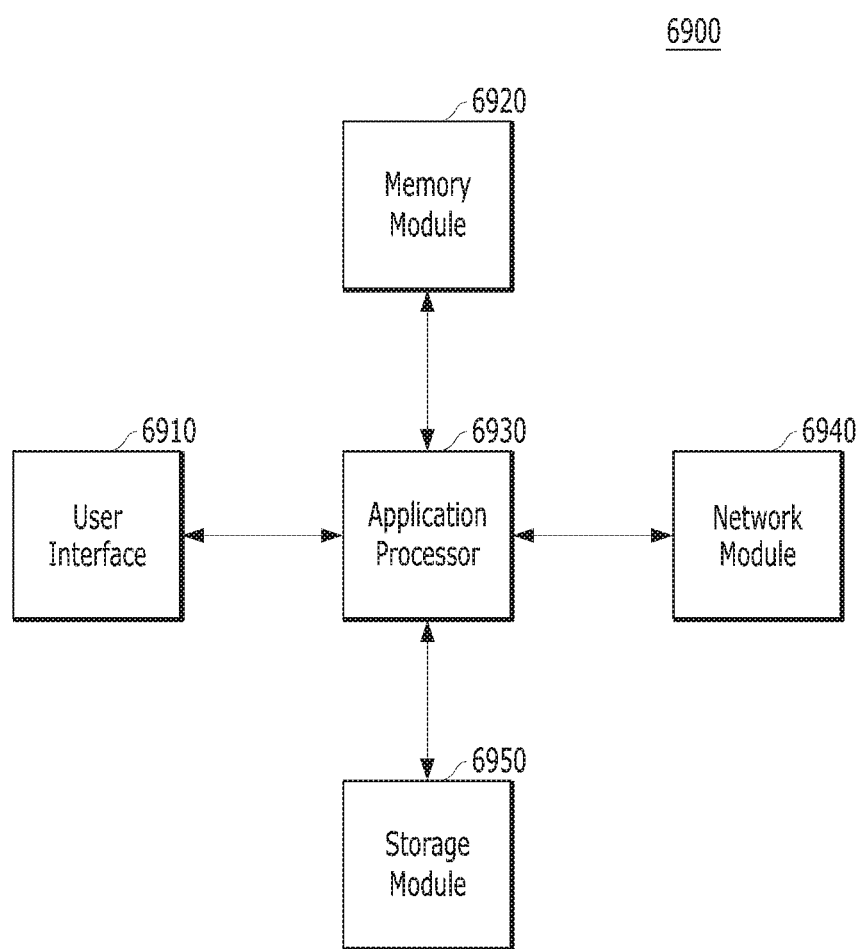

FIG. 17 is a diagram schematically illustrating another example of the data processing system including the memory system in accordance with an embodiment. FIG. 17 is a diagram schematically illustrating a user system to which the memory system in accordance with the present embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930. The storage module 6950 may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or an external drive of the user system 6900. The storage module 6950 may correspond to the memory system 110 described with reference to FIGS. 1 and 5. Furthermore, the storage module 6950 may be embodied as an SSD, an eMMC and/or an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device. The user interface 6910 may support a function of receiving data from the touch panel.

In various embodiments, a register capable of managing a time of a recovery operation is included and managed in a memory system so that, even during a booting operation of a host, the memory system may determine for itself a time at which the recovery operation of an associated nonvolatile memory device is performed.

Consequently, there is an advantage in that the time needed for the memory system to perform the recovery operation of the nonvolatile memory device may be sufficiently secured.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A data processing system comprising a host and a memory system,
   wherein the memory system comprises a recovery selection register that is volatile and a nonvolatile memory device,
   wherein the memory system sets, when reset is requested from the host, a value of the recovery selection register before resetting the nonvolatile memory device and performs, after the reset, a recovery operation on the nonvolatile memory device according to the value of the recovery selection register,
   wherein, during power-on, the host reads set first data from the memory system through a first booting operation, requests the reset to the memory system after completion of the first booting operation, and reads set second data from the memory system through a second booting operation after completion of the reset, and
   wherein the memory system performs the recovery operation at start of the second booting operation.

2. The data processing system of claim 1,
   wherein the memory system further comprises a controller configured to control an operation of the nonvolatile memory device under control of the host,
   wherein the controller comprises a host controller configured to process an operation between the controller and the host, and a memory controller coupled with the host controller and configured to process an operation between the controller and the nonvolatile memory device, and
   wherein the recovery selection register is included in the host controller.

3. The data processing system of claim 2,
   wherein, when the reset is requested from the host, the host controller checks whether to perform the recovery operation on the nonvolatile memory device through the memory controller,
   wherein, the host controller sets, when the recovery operation is checked to be performed on the nonvolatile memory device, the value of the recovery selection register to a certain value, and
   wherein the host controller sets, when the recovery operation is checked not to be performed on the nonvolatile memory device, the value of the recovery selection register to an initial value, and
   wherein, after the value of the recovery selection register is set, the host controller resets both the memory controller and the nonvolatile memory device.

4. The data processing system of claim 3,
   wherein the host controller checks, after the reset of the memory controller and the nonvolatile memory device, the value of the recovery selection register even in the absence of an independent trigger from the host, and
   wherein, when the value of the recovery selection register is checked to be set to the certain value, the host controller performs the recovery operation on the nonvolatile memory device through the memory controller.

5. The data processing system of claim 2,
   wherein, when the reset is requested from the host, the host controller checks whether to perform the recovery operation on the nonvolatile memory device through the memory controller,
   wherein, the host controller sets, when the recovery operation is checked to be performed on the nonvolatile memory device, the value of the recovery selection register to a certain value,
   wherein the host controller sets, when the recovery operation is checked not to be performed on the nonvolatile memory device, the value of the recovery selection register to an initial value, and
   wherein, after the value of the recovery selection register is set, the host controller resets the nonvolatile memory device through the memory controller.

6. The data processing system of claim 5,
   wherein the host controller starts to perform the recovery operation on the nonvolatile memory device through the memory controller while setting the value of the recovery selection register to the certain value; even in the absence of an independent trigger from the host, and
   wherein the memory controller resets the nonvolatile memory device in response to a request of the host controller, and then continues the recovery operation on the nonvolatile memory device even in the absence of an independent request from the host controller.

7. The data processing system of claim 1,
   wherein the nonvolatile memory device includes a boot loader region and a normal region, and
   wherein the host reads the set first data from the boot loader region through the first booting operation, and reads the set second data from the normal region through the second booting operation.

8. A memory system comprising:
a controller comprising a recovery selection register that is volatile; and
a nonvolatile memory device,
wherein the controller sets, when reset is requested from a host, a value of the recovery selection register before resetting the nonvolatile memory device and performs, after the reset, a recovery operation on the nonvolatile memory device according to the value of the recovery selection register,
wherein the memory system sequentially performs, during power-on, a first booting operation, an operation of the resetting, and a second booting operation, and
wherein the controller performs the recovery operation at start of the second booting operation.

9. The memory system of claim 8, wherein the controller further comprises:
a host controller configured to process an operation between the controller and the host; and
a memory controller coupled with the host controller, and configured to process an operation between the controller and the nonvolatile memory device, and
wherein the recovery selection register is included in the host controller.

10. The memory system of claim 9,
wherein, when the reset is requested from the host, the host controller checks whether to perform a recovery operation on the nonvolatile memory device through the memory controller,
wherein the host controller sets, when the recovery operation is checked to be performed on the nonvolatile memory device, the value of the recovery selection register to a certain value
wherein the host controller sets, when the recovery operation is checked not to be performed on the nonvolatile memory device, the value of the recovery selection register to an initial value, and
wherein, after the value of the recovery selection register is set, the host controller resets both the memory controller and the nonvolatile memory device.

11. The memory system of claim 10,
wherein the host controller checks, after the reset of the memory controller and the nonvolatile memory device, the value of the recovery selection register; even in the absence of an independent trigger from the host, and
wherein when the value of the recovery selection register is checked to be set to the certain value, the host controller performs the recovery operation on the nonvolatile memory device through the memory controller.

12. The memory system of claim 9,
wherein, when the reset is requested from the host, the host controller checks whether to perform the recovery operation on the nonvolatile memory device through the memory controller,
wherein the host controller sets, when the recovery operation is checked to be performed on the nonvolatile memory device, the value of the recovery selection register to a certain value,
wherein the host controller sets, when the recovery operation is checked not to be performed on the nonvolatile memory device, the value of the recovery selection register to an initial value, and
wherein, after the value of the recovery selection register is set, the host controller resets the nonvolatile memory device through the memory controller.

13. The memory system of claim 12,
wherein the host controller starts to perform the recovery operation on the nonvolatile memory device through the memory controller while setting the value of the recovery selection register to the certain value; even in the absence of an independent trigger from the host, and
wherein the memory controller resets the nonvolatile memory device in response to a request of the host controller, and then continues the recovery operation on the nonvolatile memory device; even in the absence of an independent request from the host controller.

14. A method of operating a memory system comprising a recovery selection register that is volatile and a nonvolatile memory device, the method comprising:
sequentially performing, during power-on, a first booting operation, an operation of resetting the nonvolatile memory device, and a second booting operation
performing, when reset is requested from a host, a reset operation including setting a value of the recovery selection register before the resetting; and
performing, at start of the second booting operation after the resetting, a recovery operation on the nonvolatile memory device according to the value of the recovery selection register.

15. The method of claim 14, wherein the performing of the reset operation comprises:
checking, when the reset is requested from the host, whether to perform the recovery operation on the nonvolatile memory device;
setting, when the recovery operation is checked to be performed on the nonvolatile memory device the value of the recovery selection register to a certain value;
setting, when the recovery operation is checked not to be performed on the nonvolatile memory device, the value of the recovery selection register to an initial value; and
resetting the memory controller and the nonvolatile memory device after the setting of the value.

16. The method of claim 15, wherein the performing of the recovering operation comprises:
checking, after the resetting of the memory controller and the nonvolatile memory device, by the host controller, the value of the recovery selection register even in the absence of an independent trigger from the host; and
performing, when the value of the recovery selection register is checked to be set to the certain value, the recovery operation on the nonvolatile memory device.

17. The method of claim 14, wherein the performing of the reset operation comprises:
checking, when the reset is requested from the host, whether to perform the recovery operation on the nonvolatile memory device;
setting, when the recovery operation is checked to be performed on the nonvolatile memory device, the value of the recovery selection register to a certain value;
setting, when the recovery operation is checked not to be performed on the nonvolatile memory device, the value of the recovery selection register to an initial value; and
resetting the nonvolatile memory device after the setting of the value.

18. The method of claim 17,
wherein the performing of the reset operation includes starting to perform the recovery operation on the nonvolatile memory device while setting the value of the recovery selection register to the certain even in the absence of an independent trigger from the host, and wherein the performing of the recovering operation includes continuing the recovery operation on the non-volatile memory device.

19. An operating method of a controller, the operating method comprising:
sequentially performing, during power-on, a first booting operation, a reset operation of a non-volatile memory device and a second booting operation in response to a request from a host;
setting a recovery selection value between completion of the first booting operation and start of the reset operation; and
performing, before the start of the reset operation or at start of the second booting operation, a recovery operation on the nonvolatile memory device based on the recovery selection value.

* * * * *